(12) United States Patent
Ito

(10) Patent No.: US 9,141,990 B2
(45) Date of Patent: Sep. 22, 2015

(54) EXPENSE REGISTRATION SYSTEM FOR REGISTERING EXPENSES RELATED TO DOCUMENT RECEIVED BY FAX

(71) Applicant: CANON KABUSHIKI KAISHA, Tokyo (JP)

(72) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 13/786,138

(22) Filed: Mar. 5, 2013

(65) Prior Publication Data

US 2013/0242352 A1    Sep. 19, 2013

(30) Foreign Application Priority Data

Mar. 15, 2012    (JP) ................. 2012-058652

(51) Int. Cl.
*G06F 15/16*    (2006.01)
*G06Q 40/00*    (2012.01)
*H04N 1/00*    (2006.01)
*H04N 1/32*    (2006.01)

(52) U.S. Cl.
CPC ........... *G06Q 40/00* (2013.01); *G06Q 40/12* (2013.12); *H04N 1/00116* (2013.01); *H04N 1/32106* (2013.01); *H04N 1/00244* (2013.01); *H04N 2201/0094* (2013.01); *H04N 2201/3202* (2013.01); *H04N 2201/3214* (2013.01); *H04N 2201/3216* (2013.01); *H04N 2201/3218* (2013.01); *H04N 2201/3221* (2013.01); *H04N 2201/3274* (2013.01); *H04N 2201/3278* (2013.01)

(58) Field of Classification Search
CPC ............. H04L 29/08522; H04N 1/00116; G06Q 40/00
USPC .................................. 709/203, 220, 223
See application file for complete search history.

(56) References Cited

U.S. PATENT DOCUMENTS

| 7,110,952 B2 * | 9/2006 | Kursh ................. 704/270.1 |
| 8,203,765 B2 * | 6/2012 | Pandipati ................. 358/474 |
| 2002/0097847 A1 * | 7/2002 | Kozo ................. 379/88.17 |
| 2008/0120129 A1 * | 5/2008 | Seubert et al. ................. 705/1 |
| 2012/0185368 A1 * | 7/2012 | Schloter et al. ................. 705/30 |

FOREIGN PATENT DOCUMENTS

| JP | 2008-160531 A | 7/2008 |
| JP | 2011-59254 A | 3/2011 |

* cited by examiner

*Primary Examiner* — El Hadji Sall
(74) *Attorney, Agent, or Firm* — Canon USA, Inc. IP Division

(57) ABSTRACT

An expense registration system capable of communicating with a management server that manages expenses individually for each matter includes a transmission unit configured to transmit a uniform resource locator (URL) for displaying a confirmation screen of fax reception when a document is received by fax, a response unit configured to send, if a request for the confirmation screen is received via the URL transmitted by the transmission unit, the confirmation screen as a response to the request, a reception unit configured to receive information used for managing expenses for fax reception, the information being input by a user via the confirmation screen, and a registration unit configured to register, by using the information received by the reception unit, expenses incurred in the fax reception in the management server.

12 Claims, 15 Drawing Sheets

400 FAX RECEPTION MANAGEMENT LIST

| RECEPTION ID (401) | STORAGE LOCATION (402) | RECEPTION DATE AND TIME (403) | RECEPTION COST (404) | NUMBER OF PAGES (405) | TRANSMISSION SOURCE NUMBER (406) |
|---|---|---|---|---|---|
| 0101 | Server_0302 | 2012/03/01 12:30:10 | ¥30 | 3 | 03-1111-1111 |
| 0102 | Local_0001 | 2012/03/01 15:00:00 | ¥50 | 5 | 03-1111-2222 |
| 0103 | Server_0303 | 2012/03/01 17:30:20 | ¥30 | 3 | 03-1111-1111 |

FIG.4

400 FAX RECEPTION MANAGEMENT LIST

| RECEPTION ID | STORAGE LOCATION | RECEPTION DATE AND TIME | RECEPTION COST | NUMBER OF PAGES | TRANSMISSION SOURCE NUMBER |
|---|---|---|---|---|---|
| 0101 | Server_0302 | 2012/03/01 12:30:10 | ¥30 | 3 | 03-1111-1111 |
| 0102 | Local_0001 | 2012/03/01 15:00:00 | ¥50 | 5 | 03-1111-2222 |
| 0103 | Server_0303 | 2012/03/01 17:30:20 | ¥30 | 3 | 03-1111-1111 |

FIG.5

500 MATTER MANAGEMENT LIST

| MATTER ID | MATTER NAME | CLIENT NAME | TELEPHONE NUMBER | PERSON IN CHARGE |
|---|---|---|---|---|
| 0201 | CONTRACT WITH COMPANY A | COMPANY C | 03-1111-1111 | User A |
| 0202 | CONTRACT WITH COMPANY B | COMPANY C | 03-1111-1111 | User B |
| 0203 | LAWSUIT | COMPANY D | 03-1111-3333 | User C |
| 0204 | CONTRACT WITH COMPANY E | COMPANY C | 03-1111-1111 | User A |

FIG.6A

600 DOCUMENT MANAGEMENT LIST

| DOCUMENT ID | DOCUMENT NAME | TYPE | MATTER ID | CLIENT NAME | PERSON IN CHARGE |
|---|---|---|---|---|---|
| 0301 | Contract_20120201 | CONTRACT | 0203 | COMPANY D | User A |
| 0302 | 20120301123010_03111111111 | FAX RECEPTION DOCUMENT | — | COMPANY C | MFP 101 |
| 0303 | 20120301173020_03111111111 | FAX RECEPTION DOCUMENT | — | COMPANY C | MFP 101 |

FIG.6B

600 DOCUMENT MANAGEMENT LIST

| DOCUMENT ID | DOCUMENT NAME | TYPE | MATTER ID | CLIENT NAME | PERSON IN CHARGE |
|---|---|---|---|---|---|
| 0301 | Contract_20120201 | CONTRACT | 0203 | COMPANY D | User A |
| 0302 | Contract_20120301 | CONTRACT | 0201 | COMPANY C | User A |
| 0303 | 20120301173020_03111111111 | FAX RECEPTION DOCUMENT | — | COMPANY C | MFP 101 |

FIG.7A

700 EXPENSE MANAGEMENT LIST

| EXPENSE ID | RECEPTION DATE AND TIME | TYPE | EXPENSE | MATTER ID | CLIENT NAME | PERSON IN CHARGE | RELATED DOCUMENT ID |
|---|---|---|---|---|---|---|---|
| 0401 | 2012/02/25 12:00:00 | MEETING | ¥2500 | 203 | COMPANY D | User C | — |
| 0402 | 2012/03/01 12:30:10 | FAX RECEPTION | ¥30 | — | COMPANY C | MFP 101 | 0302 |
| 0403 | 2012/03/01 17:30:20 | FAX RECEPTION | ¥30 | — | COMPANY C | MFP 101 | 0303 |

FIG.7B

700 EXPENSE MANAGEMENT LIST

| EXPENSE ID | RECEPTION DATE AND TIME | TYPE | EXPENSE | MATTER ID | CLIENT NAME | PERSON IN CHARGE | RELATED DOCUMENT ID |
|---|---|---|---|---|---|---|---|
| 0401 | 2012/02/25 12:00:00 | MEETING | ¥2500 | 203 | COMPANY D | User C | — |
| 0402 | 2012/03/01 12:30:10 | FAX RECEPTION | ¥30 | 201 | COMPANY C | User A | 0302 |
| 0403 | 2012/03/01 17:30:20 | FAX RECEPTION | ¥30 | — | COMPANY C | MFP 101 | 0303 |
| 0404 | 2012/03/02 10:10:00 | FAX CONFIRMATION | ¥50 | 201 | COMPANY C | User A | 0302 |

FIG.9

| | |
|---|---|
| 901 — | From: mfp101@xxx.com |
| 902 — | To: usera@xxx.com, userb@xxx.com |
| 903 — | Subject: Received Fax Notice 2012/03/01 12:30:10 |

904 —
DOCUMENT WAS FAX-RECEIVED BY MFP 101.
CONFIRM CONTENTS OF DOCUMENT BY REFERRING
TO THE FOLLOWING URL, AND REGISTER MATTER.

URL: http//mfp101.xxx.com/setExpenseForFax/view.cgi?id=0101
    SENDER: COMPANY C
    RECEPTION DATE AND TIME: 2012/03/01 12:30:10

REFER TO THE FOLLOWING URL FOR LIST OF FAX
RECEPTION DOCUMENTS.

905 — URL: http//mfp101.xxx.com/setExpenseForFax/list.cgi

906 — 20120301123010_0311111111.pdf

FIG.12

| | RECEPTION DATE AND TIME | RECEPTION COST | NUMBER OF PAGES RECEIVED | TRANSMISSION SOURCE NUMBER |
|---|---|---|---|---|
| ☐ | 2012/03/01 12:30:10 | ¥30 | 3 | 03-1111-1111 |
| ☐ | 2012/03/01 15:00:00 | ¥50 | 5 | 03-1111-2222 |
| ☐ | 2012/03/01 17:30:20 | ¥30 | 3 | 03-1111-1111 |

WEB BROWSER (FAX RECEPTION DOCUMENT LIST)

DELETE  1201
UPDATE  1202

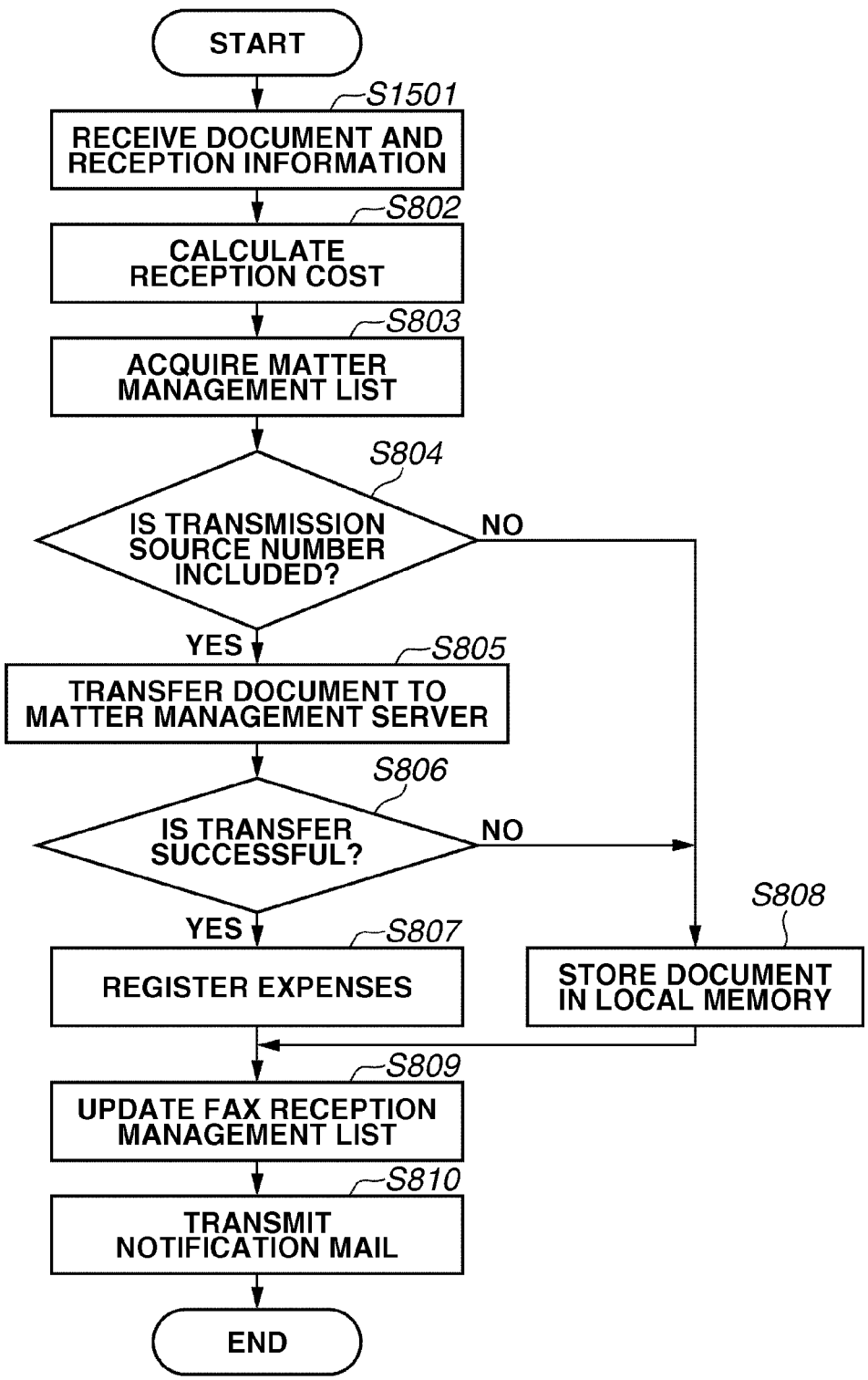

EXPENSE REGISTRATION SYSTEM FOR REGISTERING EXPENSES RELATED TO DOCUMENT RECEIVED BY FAX

BACKGROUND OF THE INVENTION

1. Field of the Invention

The present disclosure relates to an expense registration system for registering expenses related to a document received by fax (facsimile).

2. Description of the Related Art

In most patent firms or law firms (hereinafter referred to as the firms), expenses incurred in work done for clients may be charged to the clients. In this case, charges are often made in units of matters (cases) requested from the clients. In this case, the matters include, for example, a contract matter related to closing a contract between one company and the other and a lawsuit matter related to a lawsuit in which one company is a plaintiff or a defendant.

The firm makes a charge in units of matters, so that the firm separately manages expenses in units of matters. In this case, the expenses include, for example, personnel expenses incurred in work, the cost of paper consumed by copying or printing, communication costs for fax transmission and reception, and others.

In managing the expenses in units of matters, a problem is caused in that it is laborious to register expenses related to fax reception in particular. Until now, in registering expenses related to fax reception, a user has needed to calculate a reception cost from the number of pages of the received fax documents, identify that the received fax documents relate to which matter, and calculate personnel expenses required for these works.

Japanese Patent Application Laid-Open No. 2008-160531 discusses a system for notifying a user of reception a fax document. Automatically filing a document received by fax and registering the document on a document management server have also been known. However, a method for reducing labor for registering expenses related to fax reception has not been known, which still requires the user to do laborious work for registering expenses related to fax reception.

SUMMARY OF THE INVENTION

The present disclosure is directed to an expense registration system for registering expenses related to fax reception, which is capable of reducing user's labor.

According to an aspect disclosed herein, an expense registration system capable of communicating with a management server that manages expenses individually for each matter includes a transmission unit configured to transmit a uniform resource locator (URL) for displaying a confirmation screen of fax reception when a document is received by fax, a response unit configured to, if a request for the confirmation screen is received via the URL transmitted by the transmission unit, send the confirmation screen as a response to the request, a reception unit configured to receive information used for managing expenses for fax reception, the information being input by a user via the confirmation screen, and a registration unit configured to register, by using the information received by the reception unit, expenses incurred in the fax reception in the management server.

Further features and aspects of the present invention will become apparent from the following detailed description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a fax reception management list according to the first exemplary embodiment.

FIG. 5 illustrates a matter management list according to the first exemplary embodiment.

FIGS. 6A and 6B illustrate a document management list according to the first exemplary embodiment.

FIGS. 7A and 7B illustrate an expense management list according to the first exemplary embodiment.

FIG. 9 is a diagram illustrating the contents of a notification mail according to the first exemplary embodiment.

FIG. 12 is a diagram illustrating the operation screen of the PC according to the first exemplary embodiment.

FIG. 15 is a flow chart illustrating the operation of the MFP according to the second exemplary embodiment.

DESCRIPTION OF THE EMBODIMENTS

Various exemplary embodiments, features, and aspects of the disclosure will be described in detail below with reference to the drawings.

The following exemplary embodiments do not limit the claimed invention and all the combinations of characteristics described in the exemplary embodiments are not necessarily essential for solution of the invention.

Figure 1:
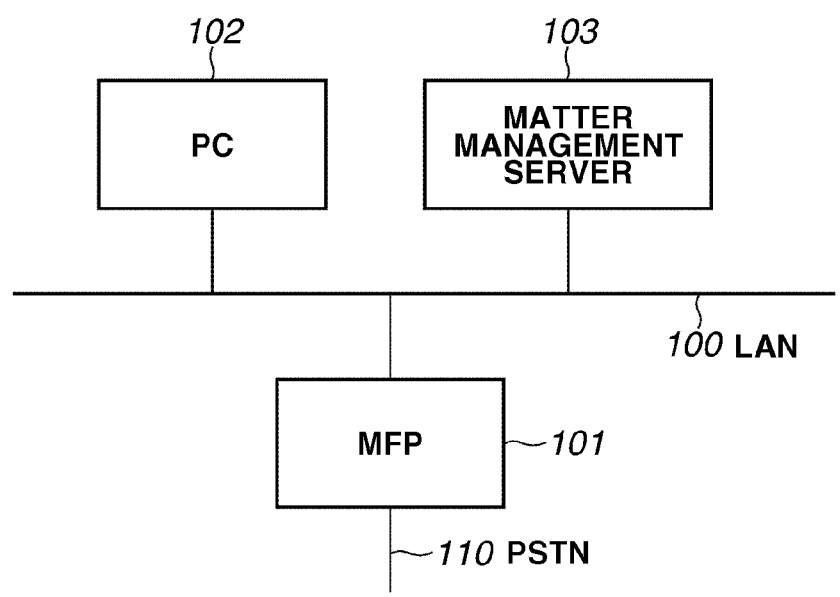
FIG. 1 illustrates a block diagram of an image processing system according to a first exemplary embodiment.

A first exemplary embodiment is described below. FIG. 1 illustrates a block diagram of an image processing system. A multifunction peripheral (MFP) 101, a personal computer (PC) 102, and a matter management server 103 are connected to one another for communication via a local area network (LAN) 100. The MFP 101 is an example of an image processing apparatus. The PC 102 is an example of an information processing apparatus. The matter management server 103 is an example of a management server.

The MFP 101 is connected to a public switched telephone network (PSTN) 110 and can perform fax transmission and reception with a fax machine (not illustrated). The MFP 101 includes a web server, and the PC 102 includes a web browser. This allows the web browser of the PC 102 to display a screen based on a hyper text markup language (HTML) and JavaScript (registered trademark) provided by the web server of the MFP 101 and operation instructions to the MFP 101 to be received from the user of the PC 102. The MFP 101 communicates with a web service provided by the matter management server 103 using Hypertext Transfer Protocol (HTTP)/Hypertext Transfer Protocol Secure (HTTPS). In FIG. 1, an example is illustrated in which the matter management server 103 exists on the LAN 100. However, the matter management server 103 may exist on the Internet. The matter management server 103 may be configured as a cloud server in which a plurality of servers performs processing in collaboration with one another.

The MFP 101 is referred to as an expense registration system. Alternatively, the MFP 101 and the PC 102 may be referred to as an expense registration system. Still alternatively, the MFP 101, the PC 102, and the matter management server 103 may be referred to as an expense registration system.

Figure 2:
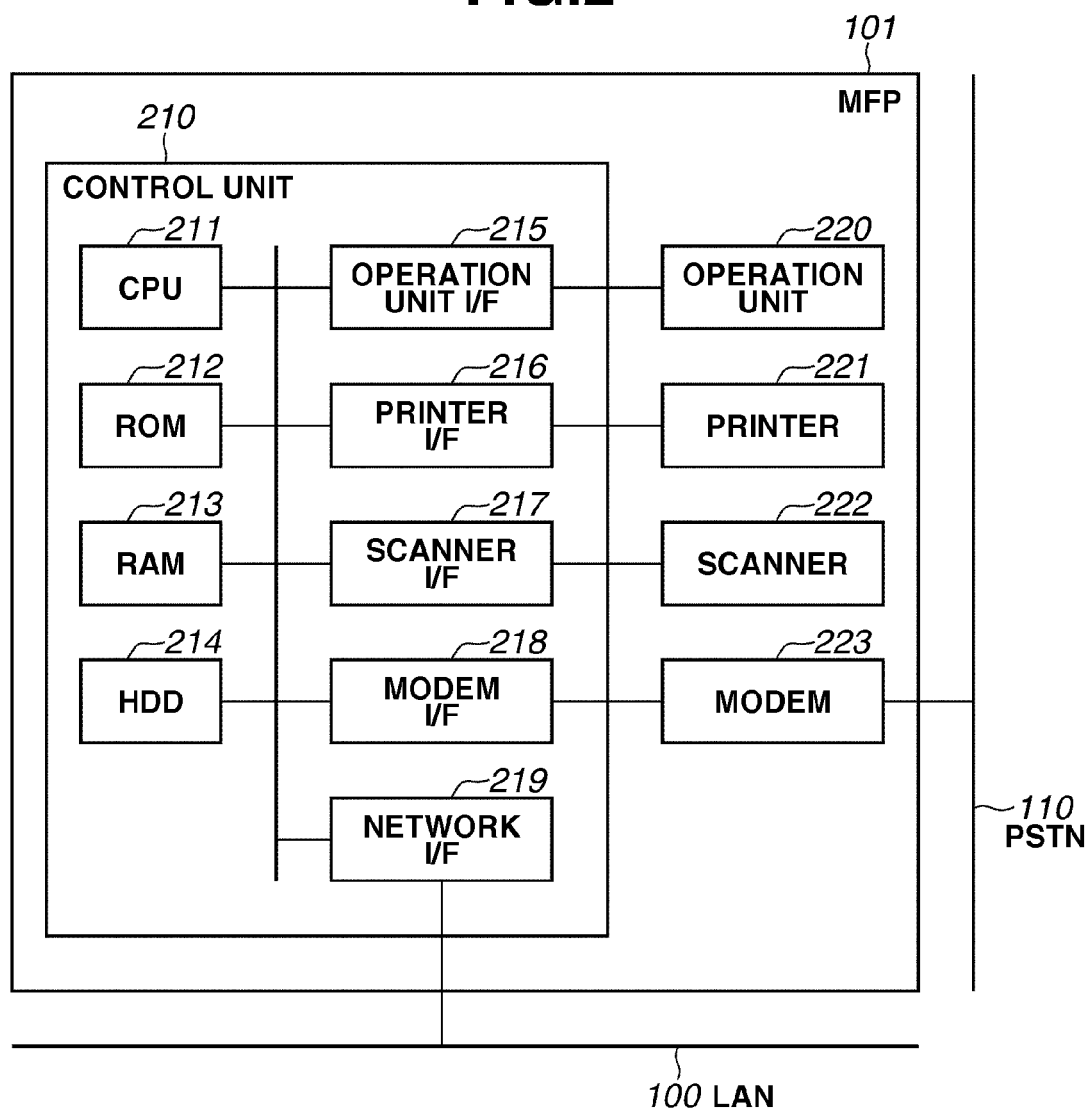
FIG. 2 illustrates a block diagram of a multifunction peripheral (MFP) according to the first exemplary embodiment.

FIG. 2 illustrates a block diagram of the MFP 101. A control unit 211 including a central processing unit (CPU) 211 controls the operation of the entire MFP 101. The CPU 211 reads a control program stored in a read only memory (ROM) 212 to perform various control operations, such as reading control and transmission control. A random access memory (RAM) 213 is used as a temporary storage area of a main memory and a work area for the CPU 211. In the MFP 101, one CPU 211 executes each processing illustrated in a flow chart described below using one memory (the RAM 2213 or a hard disk drive (HDD) 214). However, embodiments other than the above may be used. For example, a plurality of CPUs is caused to collaborate with a plurality of RAMs or HDDs to execute each processing illustrated in the flow chart described below.

The HDD 214 stores image data and various programs. An operation unit interface (I/F) 215 connects an operation unit 220 to the control unit 210. The operation unit 220 is provided with a liquid crystal display with a touch panel function and a keyboard.

A printer I/F 216 connects a printer 221 to the control unit 210. Image data to be printed by the printer 221 are transferred to the printer 221 by the control unit 210 via the printer I/F 216 to be printed on a recording medium.

A scanner I/F 217 connects a scanner 222 to the control unit 210. The scanner 222 reads images on a document to generate image data (an image file) and input the image data to the control unit 210 via the scanner I/F 217. The MFP 101 can transmit the generated image data (image file) by fax or mail.

A modem I/F 218 connects a modem 223 to the control unit 210. The modem 223 connects the control unit 210 (MFP 101) to the PSTN 110. The modem 223 communicates with a fax machine on the PSTN 110.

A network I/F 219 connects the control unit 210 (MFP 101) to the LAN 100. The network I/F 219 transmits image data and various types of information to an external apparatus (the PC 102 or the matter management server 103) on the LAN 100 and receives various types of information from the external apparatus on the LAN 100.

Figure 3:
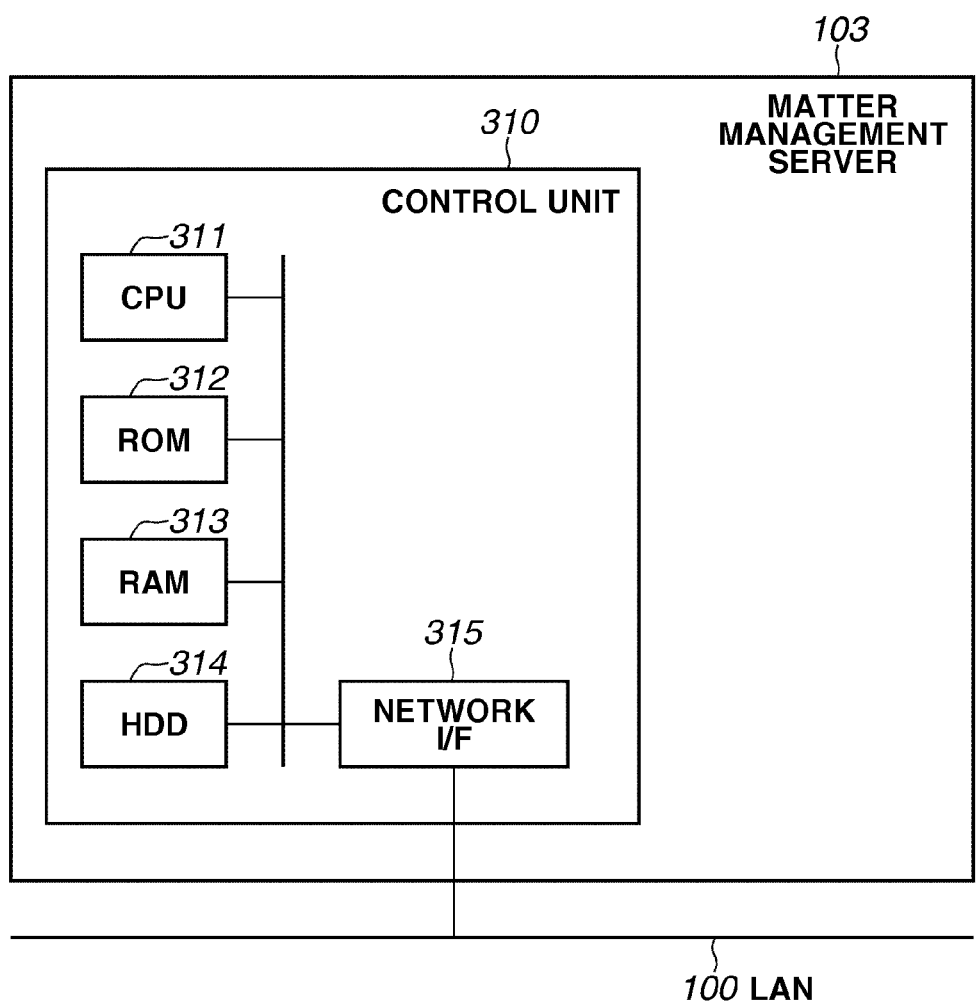
FIG. 3 is a block diagram illustrating a configuration of a matter management server according to the first exemplary embodiment.

FIG. 3 is a block diagram illustrating a configuration of the matter management server 103. A control unit 310 including a CPU 311 controls the operation of the entire matter management server 103. The CPU 311 reads a control program stored in a ROM 312 to perform various control processing. A RAM 313 is used as a temporary storage area of a main memory and a work area for the CPU 311. An HDD 314 stores image data and various programs.

A network I/F 315 connects the control unit 310 (the matter management server 103) to the LAN 100. The network I/F 315 transfers various types of information to and from other apparatuses on the LAN 100.

FIG. 4 illustrates a fax reception management list 400 stored in the HDD 214. When the MFP 101 receives a document by fax, a new record is added to the fax reception management list 400, and information related to fax reception is managed.

A reception identification (ID) 401 refers to information uniquely indicating each fax reception. A storage location 402 refers to information indicating a place where a document received by fax is stored and a document ID provided for the document in the storage location. For example, "Server_0302" in the storage location 402 means that the document received by fax is stored in the HDD 314 of the matter management server 103 and managed by the document ID of "0302." Further, "Local_0001" in the storage location 402 means that the document received by fax is stored in the HDD 214 of the MFP 101 and managed by the document ID of "0001."

A reception date and time 403 refers to information indicating the date and time when the document is received. A reception cost 404 refers to information indicating a cost required for receiving the document by fax. The number of pages 405 refers to information indicating the number of pages of the document received by fax. In the MFP 101, a unit price (including communication cost and use fees for an apparatus) of costs incurred in receiving one document page by fax is predetermined. The reception cost 404 is determined from the unit price and the number of pages 405. If the MFP 101 is connected to a plurality of telephone lines, a unit price different for each telephone line may be set. A transmission source number 406 refers to information indicating the telephone number of a transmission source that transmits a document by fax.

FIG. 5 illustrates a matter management list 500 stored in the HDD 314 of the matter management server 103. If a firm where the MFP 101 is installed receives a request for a new matter from a client, a new record is added to the matter management list 500, and information related to the matter is managed.

A matter ID 501 refers to information uniquely indicating each matter. A matter name 502 refers to information indicating the name of a matter. A client name 503 refers to information indicating the name of a client (a company) requesting a matter. A telephone number 504 refers to information indicating the telephone number of a client. A person in charge 505 refers to information indicating a person who is in charge of a matter among clerks in a firm (users of the MFP 101).

FIGS. 6A and 6B each illustrate a document management list 600 stored in the HDD 314 of the matter management server 103. A document ID 601 refers to information uniquely indicating each document. A document name 602 refers to information indicating the name of a document. A document which is fax-received by the MFP 101 and automatically transferred to the matter management server 103 is automatically provided with a document name based on date and time when the document is received by fax and the number of the transmission source of fax. For example, "20120301123010_0311111111" means that fax is transmitted from the telephone number of 0311111111 at 12 o'clock 30 minutes 10 seconds on Mar. 1, 2012.

A type 603 refers to information indicating the type of a document. A document which is fax-received by the MFP 101 and automatically transferred to the matter management server 103 is provided with the type of "fax-received document." A matter ID 604 refers to information indicating a matter to which a document is related. For example, the matter ID of the document whose document ID is "0301" is "0203," so that it is clear from FIG. 5 that the document relates to the "lawsuit" matter of a company D. If it is unidentified which matter a document relates to among documents fax-received by the MFP 101 and automatically transferred to the matter management server 103, the matter ID 604 is indicated by a hyphen "-".

A client name 605 refers to information indicating the client of a matter to which a document is related. If a document is provided with the matter ID, the client of a matter indicated by the matter ID is indicated by the client name 605. Even if it is unidentified which matter a document relates to (the matter ID is not provided), however, if it is identified which client the document relates to, information indicating a client is stored in the client name 605.

A person in charge 606 refers to information indicating a person who is in charge of a matter to which a document is related. If a document is provided with the matter ID, a person in charge of the matter indicated by the matter ID is indicated by the person in charge 606. If it is unidentified which matter the document transferred from the MFP 101 relates to (the matter ID is not provided), information indicating the MFP 101 is stored in the person in charge 606.

Documents managed by the document management list 600 are not always limited to those fax-received by the MFP 101. Image data generated by the scanner 222 of the MFP 101 reading a document, for example, are also managed by the document management list 600. Furthermore, application data generated by the document generation application installed in the PC 102 are also managed by the document management list 600.

FIGS. 7A and 7B illustrate an expense management list 700 stored in the HDD 314 of the matter management server 103. An expense ID 701 refers to information uniquely indicating each expense. A date and time 702 refers to information indicating the date and time when an expense is incurred. A type 703 refers to information indicating the type of an expense (contents of work in which an expense is incurred).

An expense 704 refers to information indicating the amount charged to an expense. A matter ID 705 refers to information indicating a matter to which an expense is related. This information is used to manage expenses individually for each matter. For example, the matter ID of the expense whose expense ID is "0401" is "0203," so that it is clear from FIG. 5 that the expense is related to the "lawsuit" matter of a company D. If it is unidentified which matter a document relates to among documents fax-received by the MFP 101 and automatically transferred to the matter management server 103, the matter ID is indicated by a hyphen "-."

A client name 706 refers to information indicating a client of a matter to which an expense is related. If an expense is provided with the matter ID, the client of a matter indicated by the matter ID is indicated by the client name 706. Even if it is unidentified which matter an expense relates to (the matter ID is not provided), however, if it is identified which client the expense is related to, information indicating the client is stored in the client name 706.

A person in charge 707 refers to information indicating a person who is in charge of a matter to which an expense is related. If an expense is provided with the matter ID, the person in charge of a matter indicated by the matter ID is indicated by the person in charge 707. If the document is transferred from the MFP 101 and it is unidentified which matter the expense relates to (the matter ID is not provided), information indicating the MFP 101 is stored in the person in charge 707.

A related document ID 708 refers to information indicating a document related to work in which an expense is incurred. For example, "0302" is stored as the related document ID in the expense whose expense ID is "0402." It is clear that the expense is incurred by fax-receiving the document managed by the document ID of "0302" in the document management list 600 in FIGS. 6A and 6B. If there is no related document like "Meeting" in the type 703, a hyphen "-" is stored in the related document ID 708.

Figure 8:
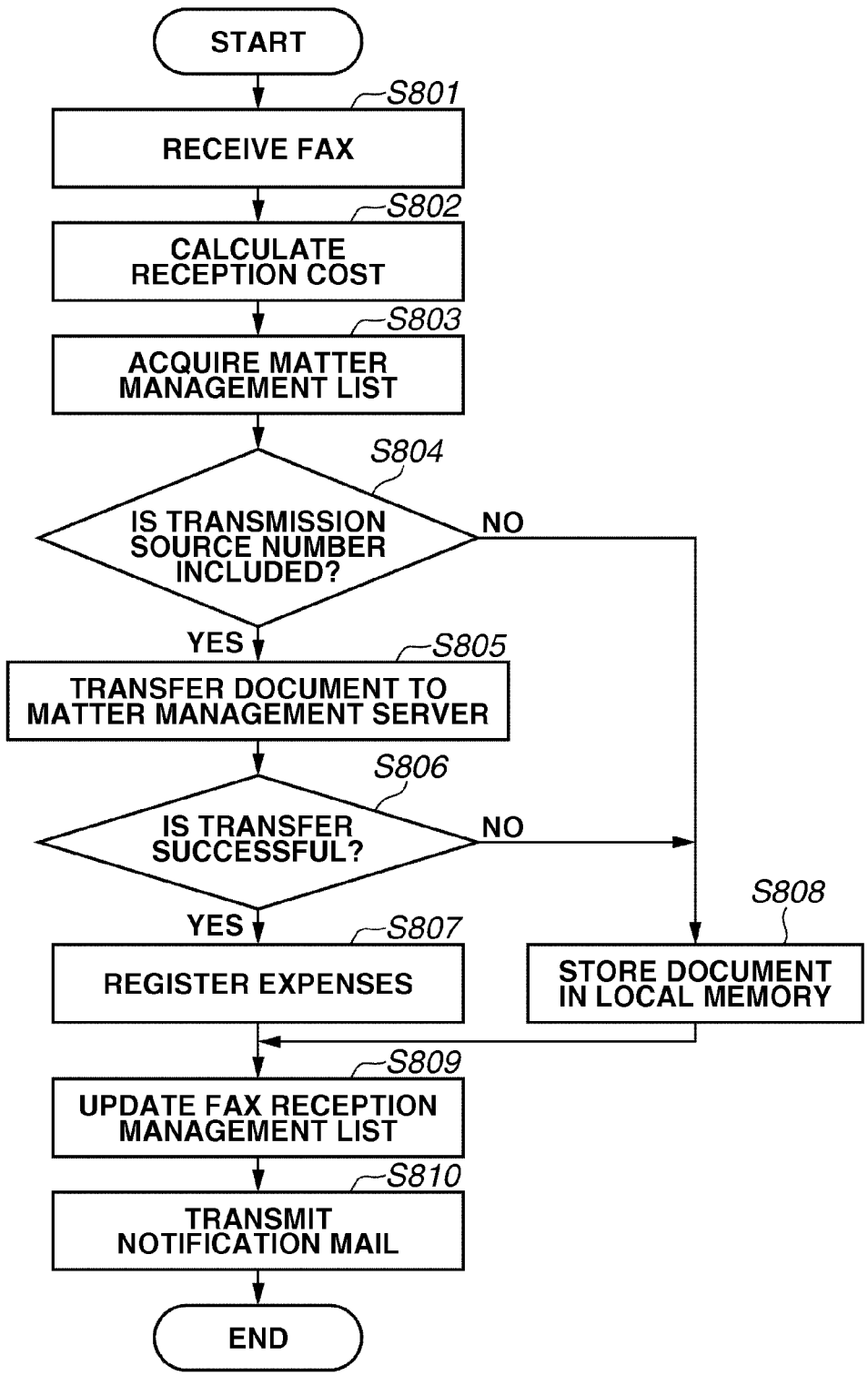
FIG. 8 is a flow chart illustrating the operation of the MFP according to the first exemplary embodiment.

FIG. 8 is a flow chart illustrating a series of operations at the time of the MFP 101 receiving a document by fax. Each operation (step) illustrated in the flow chart of FIG. 8 is realized by the CPU 211 of the MFP 101 executing a control program stored in the HDD 214.

In step S801, the CPU 211 receives a document transmitted via the PSTN 110 by fax. In step S802, the CPU 211 calculates a reception cost based on the number of pages of the document received by fax. The reception cost may be calculated by multiplying a unit price per page by the number of received pages or determined from a table which associates the number of pages with a cost. Alternatively, a method other than that may be used. For example, the reception cost may be calculated according to the length of duration of a call irrespective of the number of pages.

In step S803, the CPU 211 requests the matter management server 103 to send the matter management list 500 to acquire the matter management list 500 from the matter management server 103. In step S804, the CPU 211 determines whether the transmission source number of the document received by fax in step S801 is included in the telephone number 504 of the matter management list 500 acquired in step S803.

As a result of the determination, if the transmission source number is included therein (YES in step S804), the processing proceeds to step S805. Otherwise (NO in step S804), the processing proceeds to step S808. In step S805, the document received by fax in step S801 is transferred to the matter management server 103 to be stored in the HDD 314 thereof. In step S806, the CPU 211 determines whether the document is successfully transferred in step S805. If the document is successfully transferred (YES in step S806), the processing proceeds to step S807. If the document is unsuccessfully transferred (fails in transfer) (NO in step S806), the processing proceeds to step S808.

In step S807, the CPU 211 registers expenses incurred in fax transmission in the expense management list 700. More specifically, the MFP 101 requests the matter management server 103 to perform the following processing. A new record is added to the expense management list 700. The date and time when fax is received are stored in the date and time 702, "fax reception" is stored in the type 703, and the reception cost calculated in step S802 is stored in the expense 704.

The client name corresponding to the telephone number matching in the determination of step S804 is acquired from the matter management list 500, and the acquired client name is stored in the client name 706. The MFP 101 may acquire the client name from the matter management list 500, or the matter management server 103 notified by the MFP 101 of the transmission source number may acquire the client name.

If there is only a single matter of the client indicated by the client name 706 in the matter management list 500, the matter ID of the matter is stored in the matter ID 705. If there is a plurality of matters of the client indicated by the client name 706 therein, a matter is not yet identified in this stage, so that a hyphen "-" is stored in the matter ID 705.

If there is only a single matter of the client indicated by the client name 706 in the matter management list 500, the person in charge of the matter is stored in the person in charge 707. If there is a plurality of matters of the client indicated by the client name 706 in the matter management list 500 and the persons in charge of the matters are the same as one another, the persons in charge are also stored in the person in charge 707. If there is a plurality of matters of the client indicated by the client name 706 and the persons in charge of the matters are different from one another, a person in charge is not yet identified in this stage, so that the "MFP 101" is stored in the person in charge 707. The document ID issued by the matter management server 103 in transferring the document in step S805 is stored in the related document ID 708.

In step S808, the document received by fax is stored in the HDD 214 of the MFP 101. The document received by fax is converted into a Portable Document Format (PDF) file before stored in the matter management server 103 or the MFP 101, but may be converted into other formats.

In step S809, a new record is added to the fax reception management list 400. Pieces of information are stored in the storage location 402, the reception date and time 403, the reception cost 404, the number of pages 405, and the transmission source number 406.

In step S810, a notification mail is transmitted to notify the user that the document is received by fax and to prompt the user to register the matter, type, file name, and expense.

FIG. 9 is a diagram illustrating the contents of a notification mail transmitted in step S810. The e-mail address of the MFP 101 transmitting the notification mail is written in "From" 901. The e-mail address of destination of the notification mail is written in "To" 902. The destination of the notification mail is determined as described below. In step S804, if the CPU 211 determines that the transmission source number of the document received by fax is included in the matter management list 500, the CPU 211 acquires the person in charge of the matter of the client corresponding to the telephone number based on the corresponding telephone number from the matter management list 500. The e-mail address of the acquired person in charge is acquired from a table not illustrated and the acquired e-mail address is written in the "To" 902. If there is a plurality of matters of the client corresponding to the corresponding telephone number and the persons in charge of the matters are different from one another, the e-mail address of the persons in charge are written in the "To" 902. If the CPU 211 determines that the transmission source number of the document received by fax is not included in the matter management list 500, the e-mail address of the manager or an e-mail address on a mailing list of the firm is written in the "To" 902.

A message indicating the notification of fax reception and the date and time when fax is received are written in "Subject" 903.

A uniform resource locator (URL) 904 is the one used for confirming the contents of the document received by fax and registering a matter, type, file name, and expense. In the character string of the URL, "mfp101.xxx.com" indicates the MFP 101, and "setExpenseForFax/view.cgi" indicates the display of a confirmation screen. A query portion of "id=0101" indicates fax reception managed by the reception ID of "0101" in the fax reception management list 400. A URL 905 is the one used for displaying a list of documents received by fax. In the character string of the URL, "mfp101.xxx.com" indicates the MFP 101, and "setExpenseForFax/list.cgi" indicates the display of a list screen. An attached file 906 is a thumbnail image of the document received by fax in step S801.

Figure 10:
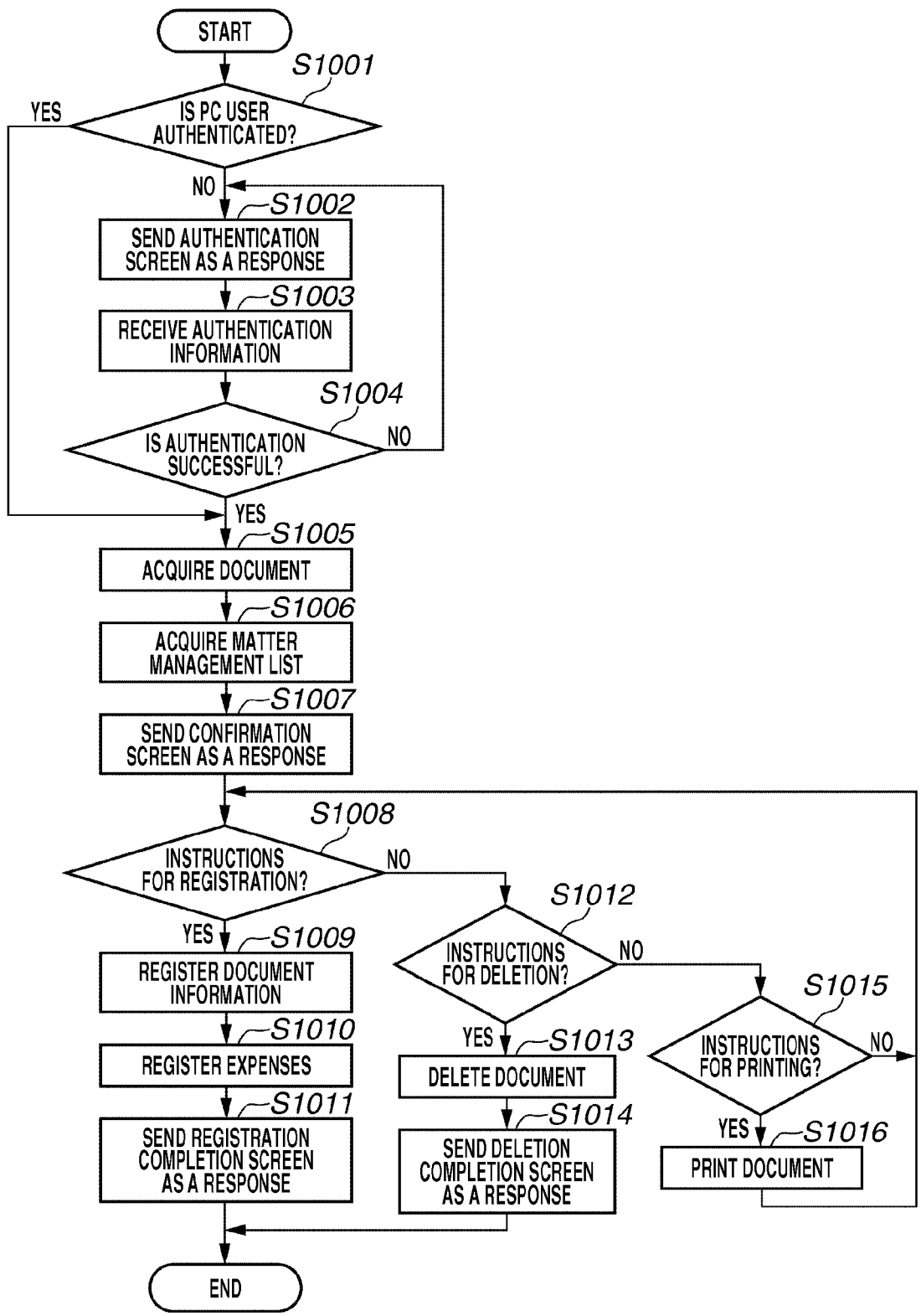
FIG. 10 is a flow chart illustrating the operation of the MFP according to the first exemplary embodiment.

FIG. 10 is a flow chart illustrating the operation of the MFP 101 at the time of the user confirming the contents of the document received by fax and registering a matter, type, file name, and expense. Each operation (step) illustrated in the flow chart of FIG. 10 is realized by the CPU 211 of the MFP 101 executing the control program stored in the HDD 214. The flow chart of FIG. 10 is started when the user of the PC 102 who receives the notification mail illustrated in FIG. 9 selects the URL 904.

In step S1001, the CPU 211 in the MFP 101 requested to send a confirmation screen by the web browser of the PC 102 determines whether the user of the PC 102 is authenticated. The determination is made based on session information included in the HTTP header from the web browser. If the CPU 211 determines that the user of the PC 102 is authenticated (YES in step S1001), the processing proceeds to step S1005. If the CPU 211 determines that the user of the PC 102 is not authenticated (NO in step S1001), the processing proceeds to step S1002. In step S1002, the CPU 211 sends an authentication screen for receiving authentication information from the user to the web browser of the PC 102 as a response. The authentication screen includes a graphical user interface (GUI) control for receiving authentication information from the user.

In step S1003, the CPU 211 receives the authentication information input by the user via the authentication screen from the web browser of the PC 102. In step S1004, the CPU 211 transmits the authentication information received in step S1003 to the matter management server 103 and determines whether the authentication information is successfully authenticated by the matter management server 103. If the authentication information is successfully authenticated (YES in step S1004), the processing proceeds to step S1005. If the authentication information is unsuccessfully authenticated (failure in authentication) (NO in step S1004), the processing returns to step S1002.

In step S1005, the CPU 211 acquires the document received by fax. For example, in the URL 904 illustrated in FIG. 9, a query portion of "id=0101" indicates that the reception ID in the fax reception management list 400 is of "0101," so that the CPU 211 acquires information "Server_0302" of the storage location 402 corresponding to "0101." The CPU 211 requests the matter management server 103 to send the document with the document ID is "0302" according to the information. If the query portion of the URL 904 illustrated in FIG. 9 "id=0102," the CPU 211 acquires information "Local_0001" of the storage location 402 corresponding to "id=0102." The CPU 211 reads the document with the document ID of "0001" from the HDD 214 of the MFP 101 according to the information.

In step S1006, the CPU 211 requests the matter management server 103 to send the matter management list 500 to acquire the matter management list 500 from the matter management server 103. The CPU 211 may acquire all the matter management lists 500 or only the record of the matter of which the user authenticated in step S1004 is in charge. In step S1007, the CPU 211 sends a confirmation screen illustrated in FIG. 11 to the web browser of the PC 102 as a response.

Figure 11:
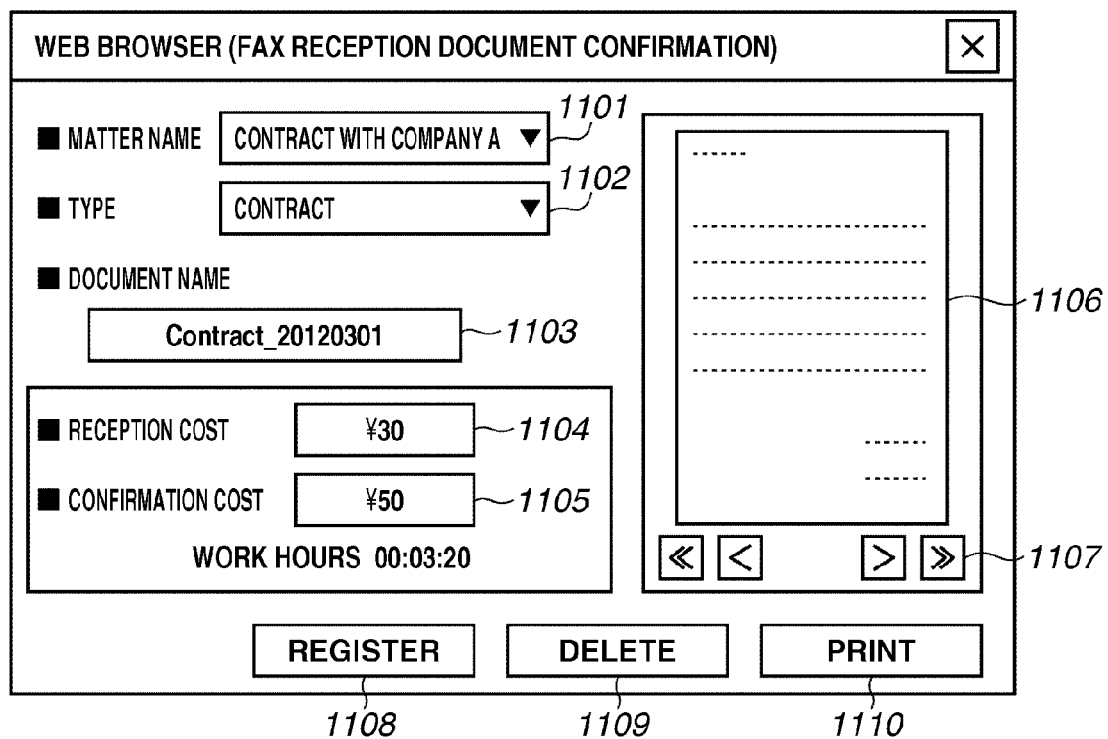
FIG. 11 is a diagram illustrating the operation screen of a personal computer (PC) according to the first exemplary embodiment.

FIG. 11 is a diagram illustrating the operation screen displayed on the display of the PC 102. The screen illustrated in FIG. 11 is displayed by the web browser of the PC 102 based on the HTML and JavaScript (registered trademark) provided by the web server of the MFP 101.

A matter name 1101 refers to the name of the matter acquired in step S1005. For example, the transmission source number 406 of fax reception with the reception ID of "0101"

in the fax reception management list 400 is "03-1111-1111." Referring to the telephone number 504 of the matter management list 500 based on the telephone number, matters with matter IDs of "0201," "0202," and "0204" correspond thereto. If the user authenticated in step S1004 is "User A," the matters of which the user is in charge are "0201" and "0204." In this case, the matter name 1101 on the screen illustrated in FIG. 11 can be selected from a pull-down format including "Contract with company A" and "Contract with company E." If the document received by fax is not transferred to the matter management server 103, all matters of which the user is in charge who is authenticated in step S1004, among the matters included in the matter management list 500, can be selected.

A type 1102 indicates the type of the document acquired in step S1005. The type 1102 can be selected from a pull-down format including type candidates predetermined by the matter management server 103 or the MFP 101.

A document name 1103 indicates the name of the document acquired in step S1005. When the screen illustrated in FIG. 11 is first displayed, the document name attached to the document acquired in step S1005 is displayed. For example, if the document with the document ID 601 of "0302" in the document management list 600 is acquired in step S1005, "20120301123010_0311111111" is written in the document name 1103. The user inputs any character string using a keyboard (not illustrated) and can change the document name.

A reception cost 1104 is a cost incurred in fax-receiving the document acquired in step S1005. For example, the reception cost 404 for receiving fax with the reception ID of "0101" in the fax reception management list 400 is "\30," so that "\30" is displayed on the reception cost 1104 when the screen illustrated in FIG. 11 is first displayed. The user can input an amount and change a cost.

A confirmation cost 1105 is a cost incurred in confirming fax using the screen illustrated in FIG. 11. Under the confirmation cost 1105 is indicated a time elapsed (work hours) since the screen in FIG. 11 was displayed. The confirmation cost 1105 is updated (added) as time elapses. It may be configured to allow work hours to be temporarily stopped.

A register button 1108 is operated when information input by the user via the screen illustrated in FIG. 11 is registered in the matter management server 103. A delete button 1109 is operated when the document received by fax is deleted and a cost is not registered. A print button 1110 is operated when the document acquired in step S1005 is printed. The document acquired in step S1005 is previewed in an area 1106. An operation key 1107 is used when pages of the document to be previewed are turned.

Referring back to FIG. 10, in step S1008, the CPU 211 determines whether the user issues instructions for "register." If the register button 1108 is operated, the CPU 211 determines that the user issues instructions for "register" (YES in step S1008), the processing proceeds to step S1009. Otherwise (NO in step S1008), the processing proceeds to step S1012.

In step S1009, document information about the matter name 1101, the type 1102, and the document name 1103 specified in the screen illustrated in FIG. 11 is transmitted to the matter management server 103. The matter management server 103 receiving the document information stores the matter ID of the matter indicated by the matter name 1101 in the matter ID 604 of the document management list 600. The type 1102 and the document name 1103 are stored in the type 603 and the document name 602 of the document management list 600. The matter ID of the matter indicated by the matter name 1101 is stored in the matter ID 705 of the expense management list 700. The person in charge who is identified by authentication performed in step S1004 is stored in the person in charge of the expense management list 700. If the document received by fax is not transferred to the matter management server 103 (stored in the MFP 101), then in step S1009, the document received by fax is transferred to the matter management server 103.

In step S1010, the reception cost 1104 and the confirmation cost 1105 specified in the screen illustrated in FIG. 11 are transmitted to the matter management server 103. The matter management server 103 receiving the above information overwrites the cost 704 of the record already generated as "fax reception" in the expense management list 700 on the amount of the reception cost 1104. A new record of "fax confirmation" is generated in the expense management list 700, and the amount of the confirmation cost 1105 is stored in the cost 704. The date and time when the register button 1108 is operated are stored in the date and time 702 of the record.

In step S1011, the CPU 211 sends a registration completion screen indicating that registration is completed to the web browser of the PC 102 as a response.

In step S1012, the CPU 211 determines whether the user issues instructions for "delete." If the delete button 1109 is operated (YES in step S1012), the CPU 211 determines that the user issues instructions for "delete" and the processing proceeds to step S1013. Otherwise (NO in step S1012), the processing proceeds to step S1015.

In step S1013, a document stored in the matter management server 103 or the MFP 101 is deleted. At this point, all records related to the deleted document among the records included in the fax reception management list 400, the document management list 600, and the expense management list 700 may be deleted. In step S1014, the CPU 211 sends a delete completion screen indicating that deletion is completed to the web browser of the PC 102 as a response.

In step S1015, the CPU 211 determines whether the user issues instructions for "print." If the print button 1110 is operated (YES in step S1015), the CPU 211 determines that the user issues instructions for "print" and the processing proceeds to step S1016. Otherwise (NO in step S1015), the processing returns to step S1008.

In step S1016, the CPU 211 prints the document acquired in step S1005 by the printer 221. At this point, the matter management server 103 may be notified of the expense incurred in print to generate a new record in the expense management list 700.

FIG. 12 is a diagram illustrating an example of an operation screen displayed on the display of the PC 102. The screen illustrated in FIG. 12 is displayed by the web browser of the PC 102 based on the HTML and JavaScript (registered trademark) provided by the web server of the MFP 101. The screen illustrated in FIG. 12 is displayed when the user of the PC 102 who receives the notification mail in FIG. 9 selects the URL 905. The authentication processing from steps S1001 to S1004 in FIG. 10 is required also in displaying the screen in FIG. 12.

A list of fax reception managed by the fax reception management list 400 is displayed on the screen illustrated in FIG. 12. If the user selects any fax reception and operates a delete button 1201 to delete the document received by fax. If the user operates an update button 1202, the CPU 211 reads the latest fax-reception management list 400 to update the screen in FIG. 12. A rink (URL 904) for displaying the screen in FIG. 11 is embedded in each row on the screen in FIG. 12 to enable shifting the screen from that in FIG. 12 to that in FIG. 11. Only the record related to the user authenticated in step S1004 may be extracted from the fax-reception management list 400 based on the transmission source number 406 in the fax-reception management list 400 and the person in charge 505 in the matter management list 500 to display the record on the screen in FIG. 12.

Figure 13:
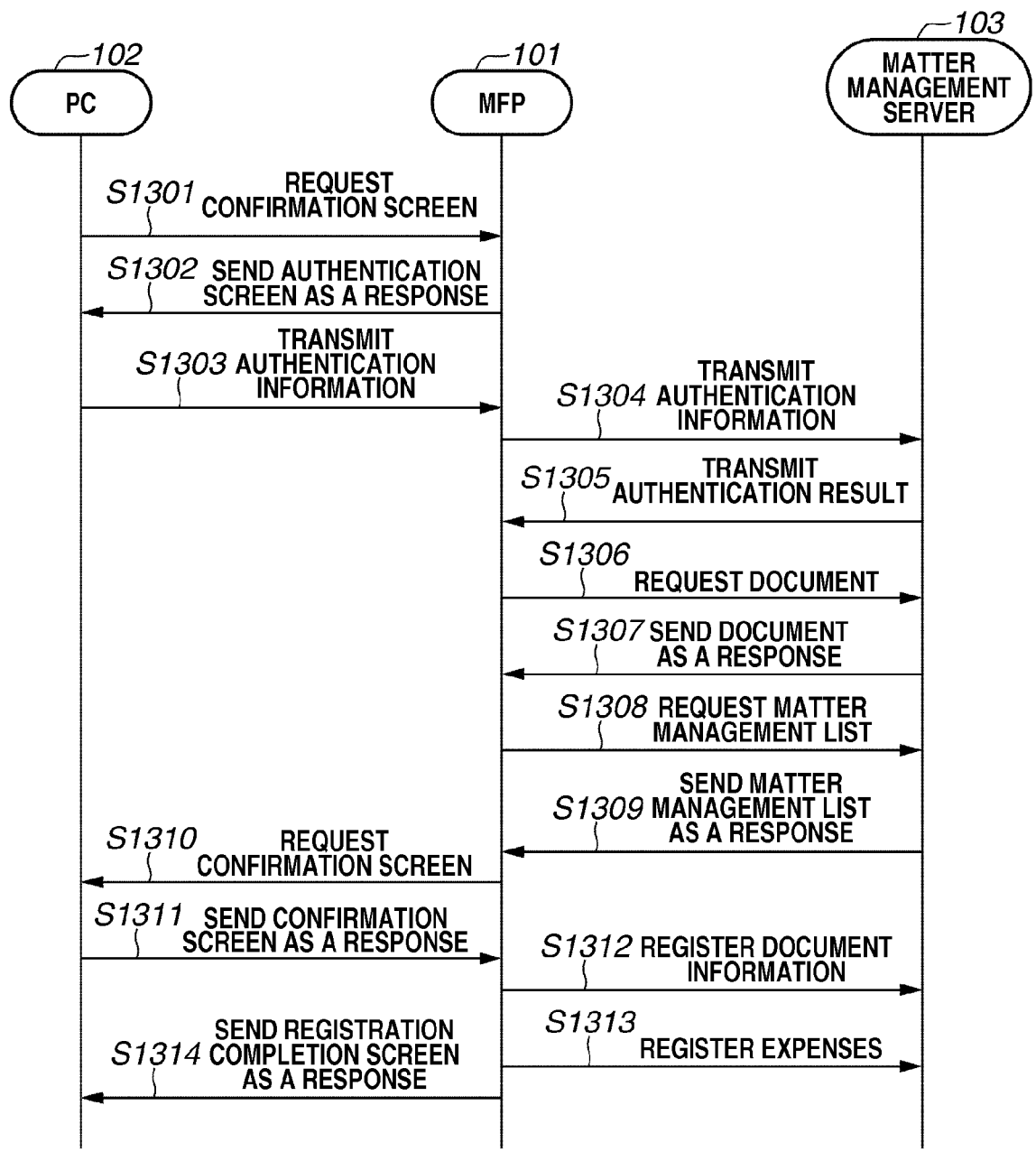
FIG. 13 is a sequence diagram illustrating the operation of the entire image processing system according to the first exemplary embodiment.

FIG. 13 is a sequence diagram illustrating a general operation in the user registering a matter, type, file name, and expense using the URL 904 indicated in FIG. 9 with each management list illustrated in FIGS. 4, 5, 6A, and 7A.

In step S1301, the web browser of the PC 102 requests the web server of the MFP 101 to send a confirmation screen based on the URL 904 in FIG. 9. The MFP 101 requested by the web browser determines that the user of the PC 102 is not yet authenticated and sends an authentication screen as a response in step S1302 (S1002). In step S1303, the authentication information input by the user via the authentication screen displayed by the web browser of the PC 102 is transmitted to the MFP 101 (S1003).

The MFP 101 transmits the authentication information received from the PC 102 to the matter management server 103. The matter management server 103 performs authentication based on the received authentication information and transmits an authentication result (indicating that the authentication is successful) to the MFP 101 (S1004).

In step S1306, the MFP 101 identifies the record with the reception ID 401 of "0101" among the records in the fax reception management list 400 based on the query portion of "id=0101" of the URL 904. The MFP 101 acquires information "Server_0302" of the storage location 402 for the identified record. The information indicates that the document is provided with the document ID of "0302" and stored in the matter management server 103, so that the MFP 101 requests the matter management server 103 to send the document with the document ID of "0302" (S1005).

In step S1307, the matter management server 103 sends the specified document to the MFP 101 as a response. In step S1308, the MFP 101 requests the matter management server 103 to send the matter management list 500 (S1006). In step S1309, the matter management server 103 sends the matter management list 500 to the MFP 101 as a response.

In step S1310, the web server of the MFP 101 sends the confirmation screen to the web server of the PC 102 (S1007). The web browser of the PC 102 displays the confirmation screen illustrated in FIG. 11. If the user operates the register button 1108 with the contents illustrated in FIG. 11 being input, the web browser of the PC 102 transmits instructions for registration and contents of the input to the web server of the MFP 101. In step S1312, the MFP 101 receiving the above information registers the document information in the matter management server 103 (S1009). In step S1313, the MFP 101 registers expenses in the matter management server 103 (S1010). In step S1314, the web server of the MFP 101 sends the registration completion screen to the web server of the PC 102.

As a result of the above processing, the document management list 600 illustrated in FIG. 6A and the expense management list 700 illustrated in FIG. 7A are changed to those in FIG. 6B and FIG. 7B, respectively. More specifically, the document name 602 of the record with the document ID of "0302" in the document management list 600 is changed from "20120301123010-0311111111" to "Contract_20120301." The type 603 of that record is changed from "fax reception document" to "contract." The matter ID 604 of that record is changed from the hyphen "-" to "0201." The person in charge 606 of that record is changed from the "MFP 101" to "User A."

The matter ID 705 of the record with the expense ID of "0402" in the expense management list 700 is changed from the hyphen "-" to "201." The person in charge 707 of that record is changed from "MFP 101" to "User A."

In the expense management list 700, a record with the expense ID 701 of "0404" is newly added. Date and time when the register button 1108 is operated are stored in the date and time 702 of the newly generated record. "Fax confirmation" is stored in the type 703 of that record. The confirmation cost 1105 of "\50" is stored in the expense 704 of that record. A numeral "201" is stored in the matter ID 705 of that record. "Company C" is stored in the client name 706 of that record. "User A" is stored in the person in charge 707 of that record. A numeral "0302" is stored in the related document ID 708 of that record.

As described above, in the first exemplary embodiment, the documents whose transmission source number is included in the matter management list 500 among the documents fax-received by the MFP 101 are automatically transferred to the matter management server 103. The CPU 211 identifies the client from the transmission source number of the document received by fax and the user corresponding to the identified client and transmits a confirmation mail to the identified user. The user receiving the confirmation mail can easily confirm the contents of the document received by fax and register a matter, type, file name, and expense thereof via the screen illustrated in FIG. 11.

A second exemplary embodiment is described below. In the second exemplary embodiment, a fax management server 104 different from the MFP 101 performing fax reception manages fax reception, transfers a document to the matter management server 103, provides a screen for the PC 102, and registers document information and expense in the matter management server 103.

Figure 14:
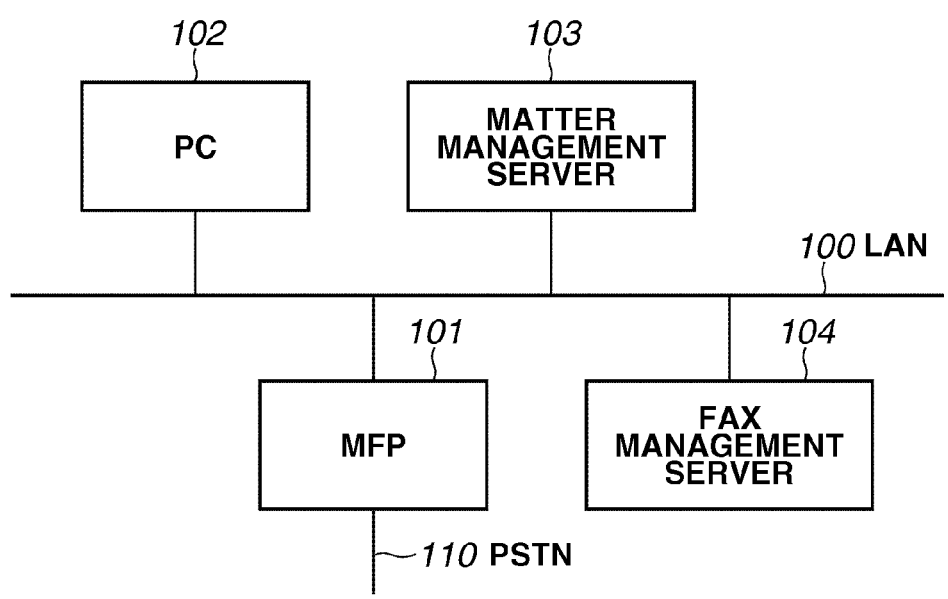
FIG. 14 illustrates a block diagram of an image processing system according to a second exemplary embodiment.

FIG. 14 is a block diagram of an image processing system according to the second exemplary embodiment. The image processing system illustrated in FIG. 14 is different from that illustrated in FIG. 1 in that the fax management server 104 is provided on the LAN 100. All the documents fax-received by the MFP 101 are transferred to the fax management server 104. The configuration of the fax management server 104 is similar to that illustrated in FIG. 3.

The fax management server 104 is referred to as an expense registration system. However, the fax management server 104 and the MFP 101 may be referred to as the expense registration system. Alternatively, the fax management server 104, the MFP 101, and the PC 102 may be referred to as the expense registration system. Still alternatively, the fax management server 104, the MFP 101, the PC 102, and the matter management server 103 may be referred to as the expense registration system.

FIG. 15 is a flow chart illustrating a series of operations of the fax management server 104 in a case where the MFP 101 receives fax and corresponds to the flow chart in FIG. 8. Each operation (step) illustrated in the flow chart of FIG. 15 is realized by the CPU 311 of the fax management server 104 executing a control program stored in the HDD 314.

It can be seen from the comparison between the flow charts in FIGS. 15 and 8 that step S1501 is included instead of step S801. In step S1501, the CPU 311 receives the document fax-received by the MFP 101 and reception information (information managed by the fax reception management list 400 such as the number of received pages, and transmission source number) from the MFP 101. The processes from steps S802 to S810 are similar to those illustrated in FIG. 8 and are executed by the fax management server 104 instead of the MFP 101.

If the user confirms the contents of the document received by fax and registers the matter, type, file name, and expense thereof in the second exemplary embodiment, the processes similar to those described with reference to FIG. 10 are executed by the fax management server 104 instead of the MFP 101. As regards printing of a document in step S1016, the fax management server 104 transmits the document to the MFP 101 and causes the printer 221 of the MFP 101 to print the document.

As described above, in the second exemplary embodiment, the fax management server 104 automatically transfers the documents whose transmission source number is included in the matter management list 500 among the documents fax-received by the MFP 101 to the matter management server 103. The fax management server 104 identifies the client from the transmission source number of the document received by fax and the user corresponding to the identified client and transmits a confirmation mail to the identified user. The user receiving the confirmation mail can easily confirm the contents of the document received by fax and register a matter, type, file name, and expense thereof via the screen illustrated in FIG. 11.

In the first and second exemplary embodiments, some clients may contract to pay a fixed amount in a specific term (one year, for example) instead of recording expenses incurred in each work. In such a case, a flag indicating that expenses are not registered may be attached to the matter management list 500 not to register the expenses of the matter to which the flag is attached in the matter management server 103.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) disclosed herein, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-058652 filed Mar. 15, 2012, which is hereby incorporated by reference herein in its entirety.

What is claimed is:

1. An expense registration system for communicating with a management server that manages expenses individually for each matter, the expense registration system comprising:
a transmission unit configured to transmit a uniform resource locator (URL) for displaying a confirmation screen of a fax reception when a document is received by fax;
a response unit configured to send, if a request for the confirmation screen is received via the URL transmitted by the transmission unit, the confirmation screen as a response to the request;
a reception unit configured to receive information used for managing expenses for fax reception, the information input by a user via the confirmation screen; and
a registration unit configured to register, by using the information received by the reception unit, expenses incurred in the fax reception in the management server.

2. The expense registration system according to claim 1, further comprising a calculation unit configured to calculate expenses incurred in the fax reception,
wherein the expenses calculated by the calculation unit are displayed on the confirmation screen.

3. The expense registration system according to claim 1, further comprising an identification unit configured to identify a matter related to the document received by fax based on a transmission source number of the document received by fax,
wherein the transmission unit transmits the URL with an e-mail address of a user in charge of the identified matter taken as destination.

4. The expense registration system according to claim 1, further comprising a transfer unit configured to transfer the document received by fax to the management server.

5. The expense registration system according to claim 4, further comprising a determination unit configured to determine whether a transmission source number of the document received by fax is managed by the management server,
wherein, if it is determined that the transmission source number of the document received by fax is managed by the management server, the transfer unit transfers the document to the management server, and if it is determined that the transmission source number of the document received by fax is not managed by the management server, the transfer unit does not transfer the document to the management server.

6. The expense registration system according to claim 4, further comprising a storage unit configured to store the document if the document is not transferred by the transfer unit.

7. The expense registration system according to claim 1, wherein the confirmation screen includes a preview display of the document received by fax.

8. The expense registration system according to claim 1, wherein the information used for managing expenses for fax reception includes information indicating a matter to which the document received by fax is related, and
wherein the confirmation screen indicates a candidate for a matter determined based on a transmission source number of the document received by fax.

9. The expense registration system according to claim 1, wherein the information used for managing expenses for fax reception includes information indicating a type of the document received by fax, and
wherein the confirmation screen indicates a candidate for the type.

10. The expense registration system according to claim 1, wherein the information used for managing expenses for fax reception includes information indicating the expenses incurred in fax reception.

11. An expense registration method for an expense registration system for communicating with a management server that manages expenses individually for each matter, the expense registration method comprising:

transmitting a uniform resource locator (URL) for displaying a confirmation screen of fax reception when a document is received by fax;

sending, if a request for the confirmation screen is received via the transmitted URL, the confirmation screen as a response to the request;

receiving information used for managing expenses for fax reception, the information being input by a user via the confirmation screen; and registering, by using the received information, expenses incurred in the fax reception in the management server.

12. A non-transitory computer-readable storage medium storing a program that causes a computer to execute the expense registration method according to claim 11.

* * * * *